(No Model.) 2 Sheets—Sheet 1.
F. HUTCHINSON.
FENCE MEASURING MACHINE.
No. 481,792. Patented Aug. 30, 1892.
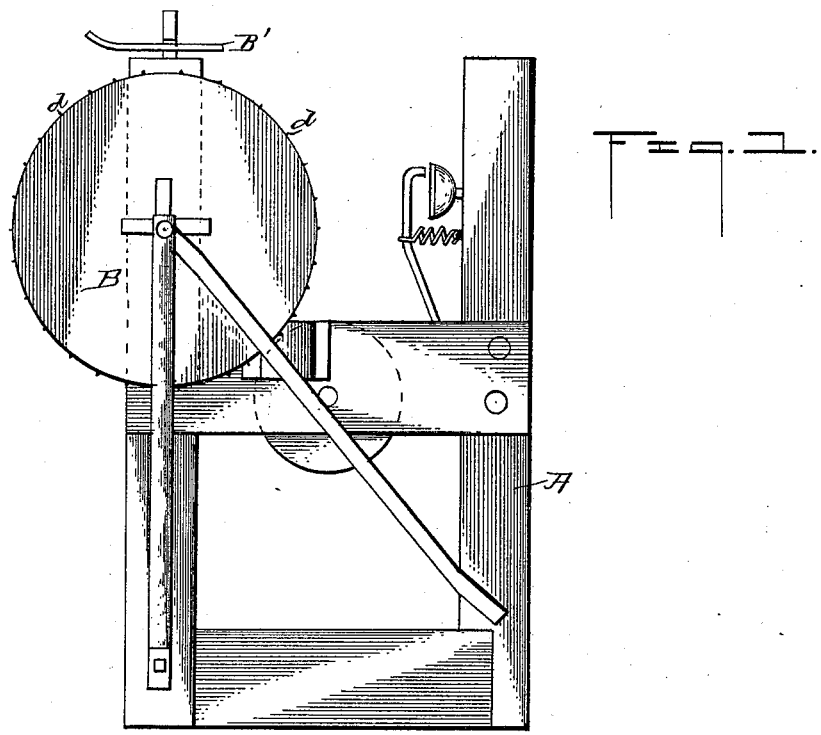
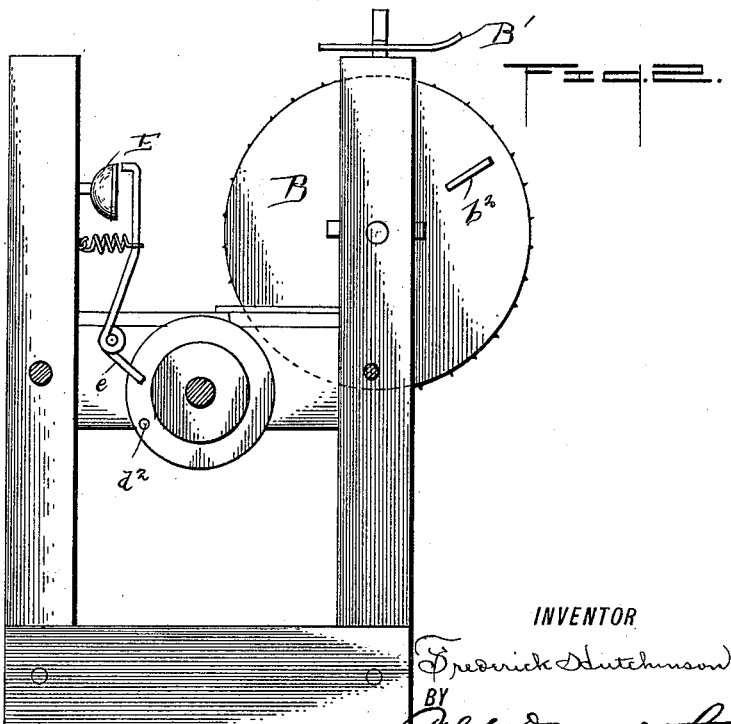
WITNESSES:
INVENTOR
Fredrick Hutchinson,
BY
HIS ATTORNEY.

(No Model.) 2 Sheets—Sheet 2.
F. HUTCHINSON.
FENCE MEASURING MACHINE.
No. 481,792. Patented Aug. 30, 1892.
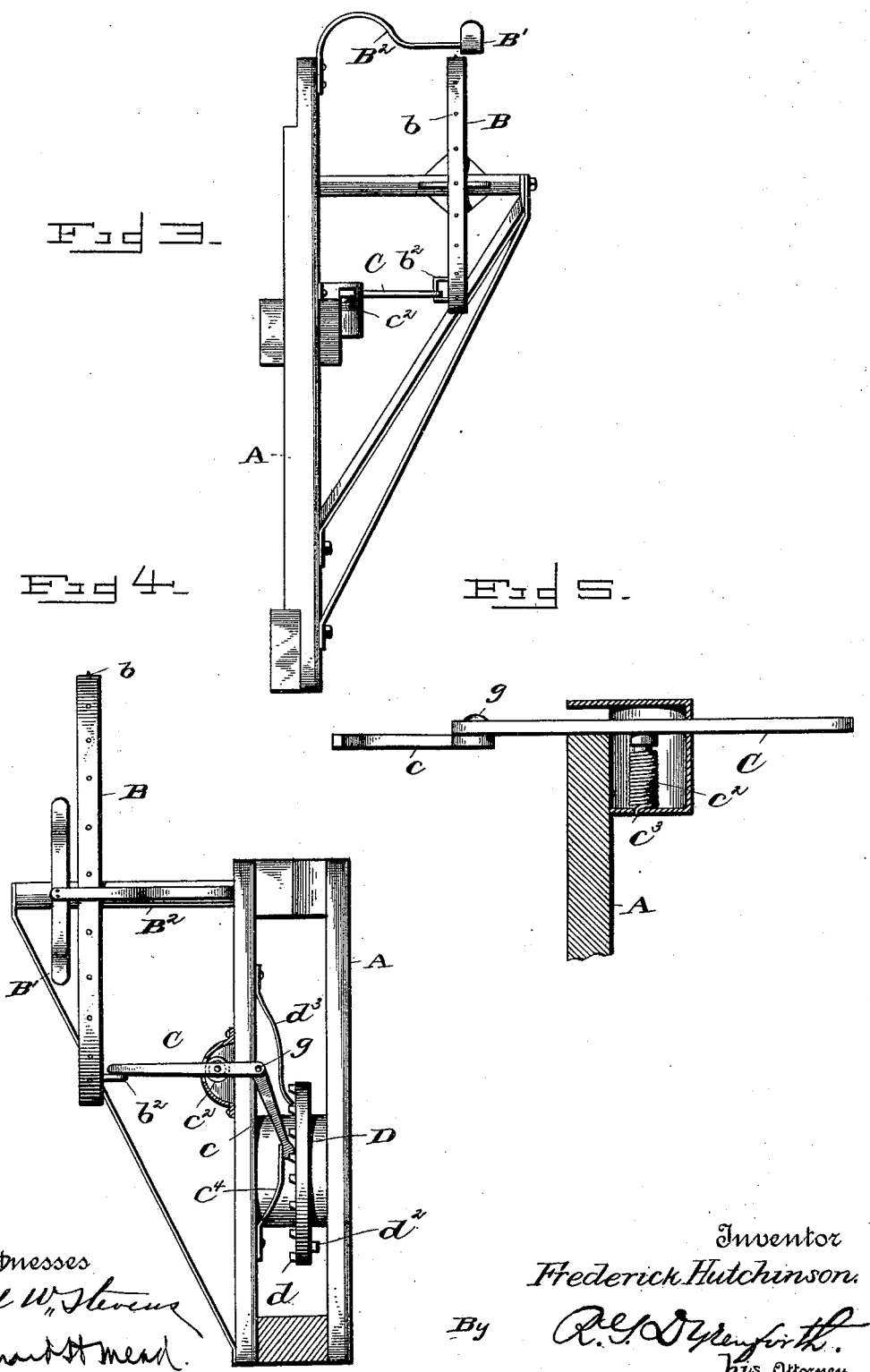
Witnesses
Paul W. Stevens
Inventor
Frederick Hutchinson.
By R. S. Dyrenforth
his Attorney

UNITED STATES PATENT OFFICE.

FREDERICK HUTCHINSON, OF JEFFERSON, IOWA.

FENCE-MEASURING MACHINE.

SPECIFICATION forming part of Letters Patent No. 481,792, dated August 30, 1892.

Application filed August 4, 1890. Serial No. 361,005. (No model.)

*To all whom it may concern:*

Be it known that I, FREDERICK HUTCHINSON, a citizen of the United States, residing at Jefferson, in the county of Greene and State of Iowa, have invented certain new and useful Improvements in Measuring-Machines; and I do hereby declare the following to be a full, clear, and exact description of the invention, such as will enable others skilled in the art to which it appertains to make and use the same.

This invention relates to measuring-machines.

Heretofore in the use of machines for manufacturing wood and wire or lath and wire fences great difficulty has been experienced and much needless time spent in measuring the completed article.

The object of the present invention is to produce a simple and inexpensive device which may be connected with or placed adjacent to fence-making machines and whereby the fence may automatically be measured as it comes from the machine and the quantity of fence measured be registered automatically.

With this object in view the invention consists, essentially, in a wheel, drum, or other movable body, over the circumference of which the fence will pass as it comes from the machine, the wheel, drum, or the like having a known circumference, and a registering device operated by the movement of the drum or wheel and showing the number of revolutions of the drum or wheel.

The invention furthermore resides in various novel details of construction whereby the objects of the invention are attained and the effectiveness of the machine insured.

I have illustrated the invention in the accompanying drawings, in which—

Figure 1 is a side elevation of the measuring device. Fig. 2 is a side elevation taken at a point opposite that at which Fig. 1 is taken. Fig. 3 is a front elevation. Fig. 4 is a plan view, parts being broken away. Fig. 5 is an enlarged view of the lever and its actuating-spring and the pawl.

In the drawings, A represents the frame of the machine, upon any suitable part of which is arranged a wheel B, the circumference of which is roughened or provided with suitable projections $d$, insuring the turning of the wheel as the fence to be measured passes over it. Arranged above the wheel is a shoe B', secured to a spring-arm B², extending from the frame A, between which shoe and the wheel the fence to be measured is to pass, the function of the shoe being to prevent raising of the fence from the wheel and to insure contact of the fence with the wheel at all times as it passes over the wheel. Placed at a suitable point near one side of the wheel or drum B is a projection $b^2$, which in its revolution describes a path encountering the end of a lever C, suitably arranged upon the frame of the machine. To the inner end of lever C is pivoted at $g$ a pawl $c$, having an offset portion on its end engaging teeth or projections $d$ on the wheel D, the inner side of said offset portion being beveled to allow it to slip readily over the projections $d$ when drawn backward. Said pawl $c$ is kept in engagement with the teeth or projections $d$ by means of a spring $c^4$, one end of which bears thereon, the other end being secured to the frame A. To prevent the return movement of the wheel D while the pawl $c$ is being withdrawn, a spring $d^3$ engages the teeth or projections $d$, the pawl $c$ in its return movement having a tendency to turn the indicator-wheel backward. The lever C when operated is returned to its normal position by spring $c^2$ encircling the pivotal portion of said lever, the spring being attached to the frame at $c^3$ at one end and to the lever C at its other end. At each revolution of the wheel B the end of the lever C is engaged by the projection $b^2$, which moves the lever inward, placing the spring $c^2$ under tension and throwing the pawl $c$ outward, thus revolving the wheel D one notch. Upon the disengagement of the lever C with the projection $b^2$ the spring $c^2$ returns it to its normal position, thus drawing the pawl $c$ backward, the offset portion thereof being pressed into engagement with the teeth or projections $d$ by the spring $c'$. The circumference of the wheel B being predetermined and being, for instance, three feet, the wheel D will be provided with thirty-three projections $d$, each projection representing one of the steps by which it is moved at each impulse of the lever C and the pawl $c$. Thus it will be seen that by thirty-three movements of the pawl the small wheel will be given a complete revolution, indicating the passage over the large wheel or drum B of ninety-nine feet of completed fence. As the wheel D completes a revolution the projection $d^2$ comes in contact with the end of a spring-hammer $e$, the upper end of which when released strikes the bell E, indicating the measurement of ninety-nine feet of material.

While I have particularly described the details of construction employed and herein shown, I do not wish to be understood as limiting myself thereto, as great modification of them may be made without departing from the spirit of my invention, the invention residing in and being thought to comprehend any device for the purpose of measuring fence and the like wherein the material to be measured passes over a revolving wheel or drum, and by the revolution of which wheel or drum an indicator by which the number of revolutions is ascertained is moved.

Having thus fully described my invention, what I claim as new, and desire to secure by Letters Patent, is—

1. A measuring-machine consisting of a drum or wheel over which the material to be measured passes, a projection on the side of said wheel adapted to engage the spring-controlled lever, the pawl pivoted to the end of said lever for actuating the indicator-wheel, and the spring engaging the projections on said indicator-wheel for preventing its return movement, substantially as described.

2. A measuring-machine consisting of a drum or wheel having a series of peripheral studs or pins thereon, a shoe arranged adjacent to the drum and connected at one end to a spring, said shoe being arranged to cause the material to be measured to bear upon the studs or pins on the periphery of said drum or wheel, a projection on the side of said wheel or drum engaging a lever for retaining it in its normal position, the pawl pivoted at the end of said lever engaging the projections of the indicator-wheel, and the spring for preventing the return movement of said indicator-wheel, substantially as shown and described.

In testimony whereof I affix my signature in presence of two witnesses.

FREDERICK HUTCHINSON.

Witnesses:
M. M. HEAD,
J. W. FITZ.